United States Patent
Carey et al.

(10) Patent No.: US 7,544,733 B2
(45) Date of Patent: *Jun. 9, 2009

(54) STAIN RESISTANT WATER-BORNE COATING COMPOSITION

(75) Inventors: Michelle Carey, Prahran (AU); Karen Elsbury, South Melbourne (AU); Patrick Houlihan, Wheelers Hill (AU); Bruce Leary, Red Hill (AU); Lisa Madigan, Prahran (AU); Thamala Weerasinghe, Rowville (AU); Chantel Marise, Carlton (AU); Susan George, Clayton (AU)

(73) Assignee: Orica Australia Pty Ltd., Melbourne, Victoria (AU)

(*) Notice: Subject to any disclaimer, the term of this patent is extended or adjusted under 35 U.S.C. 154(b) by 0 days.

This patent is subject to a terminal disclaimer.

(21) Appl. No.: 11/313,061

(22) Filed: Dec. 19, 2005

(65) Prior Publication Data

US 2006/0100358 A1 May 11, 2006

Related U.S. Application Data

(60) Division of application No. 09/942,278, filed on Aug. 27, 2001, now abandoned, which is a continuation of application No. 09/254,339, filed as application No. PCT/AU97/00584 on Sep. 8, 1997, now Pat. No. 6,420,474.

(30) Foreign Application Priority Data

Sep. 6, 1996 (AU) ................... PO 2163

(51) Int. Cl.
*C08J 3/03* (2006.01)

(52) U.S. Cl. ............... 524/501; 524/522; 524/523; 526/317.1; 526/318.4; 526/328.5; 526/347

(58) Field of Classification Search ............... 524/501, 524/522, 523; 526/317.1, 318.4, 328.5, 347
See application file for complete search history.

(56) References Cited

U.S. PATENT DOCUMENTS

| | | | |
|---|---|---|---|
| 2,868,748 A | 1/1959 | Frazier et al. |
| 4,230,609 A | 10/1980 | Burroway et al. |
| 4,421,889 A | 12/1983 | Braun et al. |
| 4,491,612 A | 1/1985 | Fischer |
| 4,794,139 A | 12/1988 | Braden et al. |
| 4,987,177 A | 1/1991 | Hartog et al. |
| 4,988,767 A | 1/1991 | Pettit, Jr. |
| 5,194,469 A | 3/1993 | Srail et al. |
| 5,215,827 A | 6/1993 | Dotzauer |
| 5,221,296 A | 6/1993 | Schwerzel et al. |
| 5,314,936 A | 5/1994 | Schwartz et al. |
| 5,756,574 A | 5/1998 | Baumstark et al. |
| 6,420,474 B1 | 7/2002 | Carey et al. |

FOREIGN PATENT DOCUMENTS

| | | |
|---|---|---|
| AU | 500903 | 2/1978 |
| AU | 618176 | 9/1990 |
| AU | 54937/94 A | 9/1994 |
| AU | 666797 | 9/1994 |
| DE | 0S 2626123 | 12/1977 |
| EP | 0 037 750 A | 10/1981 |
| EP | 0 100 493 A | 2/1984 |
| EP | 0 466 409 A1 | 7/1991 |
| EP | 0 469 295 | 2/1992 |
| EP | 0 492 210 | 7/1992 |
| EP | 0 499 835 | 8/1992 |
| EP | 0 525 977 A | 2/1993 |
| EP | 0 536 596 A | 4/1993 |
| EP | 0 562 730 A1 | 9/1993 |
| EP | 0562730 A1 | 9/1993 |
| EP | 0 652 269 A1 | 10/1994 |
| EP | 0 429 207 B | 2/1996 |
| GB | 940366 | 10/1961 |
| JP | 7703088 Y | 11/1973 |
| JP | 5 9215 365 A | 12/1984 |
| JP | 01 111 092 | 4/1989 |
| JP | 92-320334/39 | 8/1992 |

(Continued)

OTHER PUBLICATIONS

Bartholome et al., Ullmanns Encyklopadie der technischen Chemie, 4. Auflage. Verlag Chemie GmbH, Weinheim, 1980, Band 19 Polyacryl- und polymethacryl- Verbindungen, Chapter 2.4, pp. 1, 16-18, 30.

(Continued)

*Primary Examiner*—Helen L. Pezzuto
(74) *Attorney, Agent, or Firm*—Bryan Cave LLP; Charles L. Warner, II; Jason A. Bernstein

(57) ABSTRACT

Aqueous coating compositions are described where the binder includes an anionically stabilized polymeric dispersion. The monomers used to prepare the dispersion are acrylic acid and methacrylic acid as a carboxylic monomer and styrene, alpha methyl styrene or vinyl toluene as a hydrophobic high Tg aromatic monomer and an alkyl acrylate ester as a low Tg monomer. The relative weight proportions of the monomers are required to satisfy a formula. Blends of high and low Tg dispersions are also described. Paints formulated with the binders exhibit an excellent balance of stain resistance, tint strength and viscosity stability.

12 Claims, No Drawings

FOREIGN PATENT DOCUMENTS

| WO | WO 91/13849 | 9/1991 |
| WO | WO A 9323486 | 11/1993 |
| WO | WO 95/09209 | 4/1995 |
| WO | WO 95/09210 | 4/1995 |
| WO | WO 96 10588 | 4/1996 |
| WO | WO 96/22338 | 7/1996 |

OTHER PUBLICATIONS

Simpson, L.A., "Factors Controlling Gloss of Paint Films," Progress in Organic Coatings, 6(1978), pp. 21-22.
Sales invoices for PRIMAL HG-74D dated 1992.
Technical Sales Brochure entitled PRIMAL HG-74D issued prior to Sep. 1996.
Shipping Orders for RHOPLEX HG-74P dated 1995.
Technical Sales Brochure entitled RHOPLEX HG-74M dated Oct. 1991.
Ullmann's Encyclopedia of Industrial Chemistry, vol. A 21, p. 169, 1992, VCH Publishers, Inc.
Polymer Handbook, 3rd edition, John Wiley & Sons, 1989.
Bartholome et al.; Ullmanns Encyclopaedia of Industrial Chemistry; 4th Revised and Supplemental Edition; vol. 19; pp. 16-18 (translated), 1980.
Holsworth; Application of Thermal Methods of Analysis to Organic Coatings and Related Materials; Journal of Paint Technology; Mar. 1969; pp. 167-170; vol. 41, No. 530.
Hoy; Effect of Reaction Pathway on Emulsion Plymer Structure; Journal of Coatings Technology; Apr. 1979; pp. 27-41; vol. 51, No. 651.
Padget; Polymers for Water-Based Coatings—A Systematic Overview; Journal of Coatings Technology; Dec. 1994; pp. 89-105; vol. 66, No. 839.

STAIN RESISTANT WATER-BORNE COATING COMPOSITION

CROSS-REFERENCE TO RELATED APPLICATIONS

This application is a divisional of U.S. patent application Ser. No. 09/942,278, filed Aug. 27, 2001, now abandoned, which is a continuation of U.S. patent application Ser. No. 09/254,339, filed May 27, 1999, now U.S. Pat. No. 6,420,474, issued Jul. 16, 2002, which is a national phase entry of PCT/AU97/00584, filed Sep. 8, 1997, which claims the priority of Australian Patent Application No. PO 2163, filed Sep. 6, 1996. The entirety of each of the above is hereby incorporated herein by reference.

TECHNICAL FIELD OF THE INVENTION

This invention relates to water-borne coating compositions and in particular to coating compositions that exhibit good stain resistance properties.

BACKGROUND OF THE INVENTION

Paints are widely used in households for application to both interior and exterior surfaces. For interior surfaces, particularly in kitchens and living areas the resistance of a paint film to domestic stains is an important property. This is especially the case for trim and wall paints that are frequently exposed to domestic stains.

Domestic staining materials include food, oil or grease and beverages such as coffee and red wine. For semi and low gloss interior paints, properties such as mar resistance and wet and dry scrub properties are also important. Good performance for these properties enables the stained surface to be cleaned by scrubbing without causing the treated area to "gloss up" and exhibit a gloss that is different from the surrounding area. However, it is clearly preferable that the paint be not very susceptible to staining materials as well as being able to be effectively cleaned.

Painted surfaces are also susceptible to staining from the substrate, especially in the case of timber substrates containing tannins. The tannin material can "print through" the paint film, discolouring the paint after it has dried. This problem is particularly evident with water-borne latex paints. Various factors can effect this substrate staining and special water-borne latex paints have been developed to overcome this problem. However, in this invention we are not concerned with this type of staining but staining on the outermost surface of the paint. Paints that perform well for substrate staining do not necessarily exhibit good resistance to domestic stains and vice-versa.

Conventional organic solvent based paints that have alkyd resins as binders and which form tightly crosslinked paint films generally exhibit excellent stain resistance properties. It is believed this is due to the low solubility of the staining material in the paint film. However, these paints are losing favour because of the combined adverse effects of volatilised organic solvents on the environment and inconvenience for the applicator from long recoat times and clean up requiring the use of organic solvents. Water-borne versions of alkyds suffer from yellowing problems, particularly in kitchen areas and have not yet met the needs of the market. Conventional water based or latex paints in which the paint film is formed by the coalescence of vinyl or acrylic thermoplastic polymer particles are widely used but hitherto have not exhibited excellent stain resistance together with the required balance of other paint properties, including hardness, film coalescence, pH viscosity stability, and tint strength.

It is essential for adequate mechanical film properties of conventional water based paints that there is good polymer particle coalescence over the range of temperatures encountered in ordinary use. Coalescence is directly related to the hardness or glass transition temperature (Tg) of the polymer particles. Low Tg polymers allow coalescence at lower temperatures than for higher Tg polymers. The hardness of a paint film influences properties such as scuff and abrasion resistance. Maximising film hardness is important especially for paints in kitchens and living areas. Hardness is usually increased by increasing the Tg of the polymer particles. However, enhancing the hardness by increasing the Tg of the polymer in the particle leads to poorer coalescence. In practice the compromise between these properties is overcome by using a volatile temporary organic plasticiser that allows the use of higher Tg polymer particles than otherwise would be able to be used. However, such formulations suffer from the disadvantage of poor early film hardness. This occurs as the volatile plasticiser may take some days before completely volatilising and being removed from the paint film. The use of volatile plasticisers is also not favoured in some applications as it leads to the release into the atmosphere of organic solvents. For trim paints it is desirable that they have film hardness greater than conventional water-borne latex paints intended for broad wall application.

Viscosity stability is an important property for commercial paint formulations. Paint products are commercially manufactured within permissible tolerances to predetermined specifications It is important that satisfactory paint characteristics are maintained across the allowable range in the specification. With regard to aqueous latex paints, pH is a manufacturing variable that may be in a range of, for example, 8.5 to 9.5. Viscosity is a paint property that may vary with pH change and for such paints it is important that viscosity at both low and high shear rates is within acceptable limits throughout the pH specification range. Viscosity at low shear rates tends to influence flow and levelling properties. Viscosity at high shear rates affects ease of brushing. A further aspect of viscosity stability is the effect of storage on this property. It is obviously desirable that viscosity does not significantly change with time given the possible long shelf life of commercial products.

The tint strength of a paint is an important property as it indicates whether a paint can be tinted to a particular colour using a standard tinting formula. It is a requirement that paints across a range of product types have similar tint strength so that common tinting formulae may be used across that range. The tint strength is a measure of the amount of coloured tinter that must be added to a white base paint to give a particular colour. If the base paint requires a smaller amount of the tinter it is described as being of low tint strength. Paint with low tint strength may be reformulated with higher levels of titanium dioxide pigment but this can add significantly to formulation costs. Conversely if the tint strength of a base paint is high it would be possible for it to be reformulated with lower levels of titanium dioxide pigment to give the required tint strength at a lower formulation cost. For such a reformulation to be acceptable opacity would be required to be maintained. Accordingly, it is desirable that the tint strength is close to or equal to other products across the range without having to reformulate the product with high levels of titanium dioxide pigment. In addition, tint strength must be stable over time because of the possible long shelf life of paints.

The binders used for conventional water based paints include a wide range of materials. A recent review article entitled "Polymers for Water-Based Coatings—A Systematic Overview" by J. C. Padget in Journal of Coatings Technology, Vol 66. No. 839, December 1994 at pp 89-101 summarises the various types of materials used. These range from disperse polymers in water such as those used in latex paints to fully water soluble solution polymers. A further class of binders are referred to as water reducible resins which are a hybrid between the water insoluble polymer binders and fully water soluble binders. Such hybrid resin systems usually require significant levels of organic cosolvents to be present and these systems are intended for industrial rather than domestic household applications. An example of such a resin system is disclosed in U.S. Pat. No. 4,230,609 (Burroway et al).

The use of copolymerisable acrylic acid in addition copolymers is summarised in Table 2 of the Padget article and this shows the general effect of increasing the acrylic acid level from 0 to 100%. The viscosity characteristics on neutralisation are set out as the level of acid is increased. At acrylic acid levels of 1% or more the viscosity is described as increasing on neutralisation. At levels of acrylic acid of from 1-2% this viscosity increase is described as being substantially overcome by using a hydrophobic co-monomer such as styrene. This would be as a replacement for a less hydrophobic hard co-monomer such as methyl methacrylate. We have found that while maintaining viscosity stability such latexes tend, when formulated as paints, to perform unsatisfactorily for tint strength and stain resistance. We have observed similar performance in paints formulated from latexes described in Australian Patent No. 500,903 in the name of Hoechst. Example 1 of that patent describes the preparation of a butyl acrylate/styrene/methacrylic acid/acrylic acid/acetoacetic acid allyl ester in the weight proportions of 300/300/12/6/12. This calculates as 1.90% methacrylic acid and 0.95% acrylic acid on total monomers.

In Rohm and Haas European Patent No. EP 0 466 409 the preparation of a number of latexes is described for use in blending hard and soft latexes to provide paints with good block resistance. The composition of the samples containing carboxylic acid co-monomers are set out in TABLE 1 where the monomer amounts are by weight:

TABLE 1

| Sample No | EHA | BA | MMA | Styrene | AN | MAA |
|---|---|---|---|---|---|---|
| 1 | — | 1105 | 39.1 | 496.4 | — | 42.5 |
| 2 | — | 459 | 19.5 | 1179 | — | 34 |
| 3 | — | 969 | 680 | — | — | 34 |
| 4 | — | 459 | 1190 | — | — | 34 |
| 5 | 510 | — | 393 | 695.3 | 425 | 34 |
| 6 | 855.1 | — | 39.3 | 350.2 | 425 | 34 |
| 7 | — | 969 | 39.3 | 640.9 | — | 34 |
| 8 | — | 816 | 39.3 | 793.9 | — | 34 |

EHA = Ethyl hexyl acrylate
BA = Butyl acrylate
MMA = Methyl methacrylate
AN = Acrylonitrile
MA = Methacrylic acid In samples 2-8 the methacrylic acid level is approximately 2.0% and for sample 1 it is 2.5%.

PCT Patent Application No. PCT/AU94/00600 discloses water-borne soil resistance coatings. These coatings make use of a binder that is a blend of low and high Tg polymeric dispersions in particular ratios. While soil resistant coatings of this invention have good properties with regard to soil resistance they do not exhibit very good stain resistance properties when tested as interior trim paints.

Aqueous paints which comprise latex polymer particles having different hardnesses have been proposed to improve specific properties of paint films including film hardness, block resistance, coalescence and soil resistance.

In Rohm and Haas European Patent No. EP 0 466 409, referred to previously, blends of hard and soft emulsion polymers are used. The hard emulsion polymer has a Tg greater than 20° C. and the soft emulsion polymer has a Tg less than 20° C. The compositions described in this prior art specification are claimed to be particularly useful in providing good block resistance when formulated as interior semi-gloss paints whilst retaining good film formation properties at low temperature. No statement is made about stain resistance. At page 5 of this prior art specification the inventors explain that if a soft emulsion polymer is blended with increasing amounts of a hard emulsion polymer, the minimum film forming temperature (MFFT) of the blend will remain about equal to the MFFT of the soft polymer until the hard polymer is about 50 weight percent of the polymer blend. As it is important for their compositions to have good low temperature film coalescence the preferred binder compositions have 60% by weight soft and 40% by weight hard polymer. In their examples the soft to hard latex polymer ratio varies from 4:1 to 1.5:1 and all the soft polymers have a MFFT greater than 0° C.

Japanese patent J 5 9215-365-A in the name of Nippon Acryl Kagaku discloses compositions obtained by mixing 35-45 wt % acrylic resin emulsion of Tg 25 to 50° C. and 55-65 wt % acrylic resin emulsion of Tg −10 to +15° C. These compositions thus have a soft to hard ratio of 1.9:1 to 1.2:1. These compositions also have an organic plasticiser which may be volatile. Whilst these paints have particular application as ventilator coatings to prevent the smearing of the surface, stain resistant properties are not examined, though they would be expected to be poor based on the monomer composition.

Hoy discusses the effect of a number of composition and processing variables in an article entitled "Effect of Reaction Pathway on Emulsion Polymer Structure" in Journal of Coatings Technology Vol 51, No. 651 April 1979 at pages 28-41. In a number of model systems he examines the effect of high Tg monomer on viscosity in very dilute systems. His model systems use various monomers and when he uses styrene his study is confined to polymeric dispersions where the overall Tg of the dispersions was from 27 to 100° C. His study suggests that the use of styrene as a co-monomer would lead to polymeric dispersions where the carboxylic groups were buried.

Australian patent No. 666 797 discloses latex paints having good stain resistance properties. These paints are required to have a non-cellulosic thickener and use a binder that has at least 40 mole percent of styrene and α-methyl styrene. An example of a preferred polymer is a copolymer of 49 mole % styrene, 11 mole % α-methyl styrene, 22 mole % 2-ethyl hexyl acrylate and 18 mole % methyl methacrylate. This preferred composition together with other preferred latex compositions do not have present any carboxylic acid moieties. While we have found paints described in this patent have generally good stain properties they are less than optimum for stain resistance to certain common household staining materials.

SUMMARY OF THE INVENTION

This invention provides in one form an aqueous coating composition comprising an anionically stabilised addition polymerised polymeric dispersion polymerised from a carboxylic acid containing ethylenically unsaturated monomer selected from acrylic acid and methacrylic acid, a hydrophobic aromatic ethylenically unsaturated high Tg monomer selected from styrene, alpha-methyl styrene, vinyl toluene and a $C_2$-$C_{12}$ acrylate ester monomer characterised in that the relative proportions of ethylenically unsaturated monomers are selected such that Equation I is satisfied.

$$a = \frac{5+b}{(c+d/2.4)^2} \quad \text{I}$$

where
a=2.0-13.0
b=weight percent hydrophobic aromatic high Tg monomer
c=weight percent acrylic acid
d=weight percent methacrylic acid Preferably the weight percent of hydrophobic aromatic monomer is 8 to 70 and more preferably 10 to 50. Preferably the polymeric dispersion has a number average particle size less than 200 nanometers, more preferably 150 nanometers and most preferably less than 120 nanometers.

Preferably a=2.5-10.0.

A further form of this invention provides an aqueous coating composition comprising a blend of a low Tg and a high Tg aqueous polymeric dispersion characterised in that: the polymer dispersion with low Tg has a Tg less than 0° C., the polymer dispersion with high Tg has a Tg of at least 25° C., the volume ratio of low Tg polymer dispersion to high Tg polymer dispersion is from 0.4:1 to 3:1, the high Tg polymer dispersion is defined above. In this further form preferably the low Tg polymer dispersion is non-ionically stabilised.

In a still further form of this invention an aqueous polymeric dispersion is provided in which the addition of polymerisable monomers are selected to satisfy Equation I.

DETAILED DESCRIPTION OF THE INVENTION

We have found that the anionically stabilised polymeric dispersions of the present invention may confer useful properties when formulated as water-borne paints. The Tg of the polymeric dispersion may vary widely but is preferably in the range −15 to 60° C. and more preferably −5 to 25° C. When the Tg of polymer in the polymeric dispersion is in the range of 0-30° C. they may be used as the sole polymeric binder and paints exhibiting good stain resistance, viscosity, stability and tint strength can be prepared. These good properties are generally maintained when an additional binder is used. However, the beneficial properties other than viscosity stability tend to worsen as other binders are used in combination with the dispersions of the present invention. When the Tg is 25° C. and above paints may be formulated by combining this polymeric dispersion with an aqueous polymeric dispersion of low Tg. This low Tg polymeric dispersion may be non-ionically or anionically stabilised. The low Tg polymeric dispersion may have a composition as defined in Equation I.

The anionically stabilised latex of this invention are copolymers of addition polymerisable ethylenically unsaturated comonomers.

We have found that good paint properties are obtained provided the specified ethylenically unsaturated monomers are used in proportions such that the relationship defined in Equation I is maintained. When monomers are selected such that a in Equation I is less than 2, paints tend to exhibit unsatisfactory viscosity stability. When a is greater than 13, good viscosity stability is usually maintained but poorer tint strength and stain resistance are observed.

Styrene, alpha-methyl styrene and vinyl toluene are suitable hydrophobic aromatic monomers.

Mixtures of acrylic and methacrylic acid may be used as well as each acid alone. Acrylic acid is our preferred acid. The level of methacrylic acid in a polymeric dispersion is preferably less than 6% of total monomers and more preferably less than 4% of total monomers.

Styrene is our preferred hydrophobic aromatic high Tg monomer. In our preferred formulation styrene may be the sole hydrophobic aromatic high Tg monomer. Alternatively, mixtures of styrene and alpha methyl styrene or vinyl toluene may be used.

Preferred alkyl acrylates are ethyl acrylate, butyl acrylate and 2-ethyl hexyl acrylate.

We use the term high or low Tg monomer as meaning the Tg of a homopolymer of such a monomer. High Tg is greater than 40° C. and low Tg is less than 20° C.

Apart from styrene, alpha-methyl styrene, vinyl toluene, acrylic acid, methacrylic acid and alkyl acrylates other optional comonomers may be used. Examples of useful comonomers include alkyl acrylates and methacrylates where the alkyl group has 1 to 20 (and more preferably 1 to 8) carbon atoms, vinyl acetate, acrylonitrile and simple or substituted olefines such as butadiene ethylene and vinyl chloride. Monomers such as methyl methacrylate and higher alkyl methacrylate esters are usually preferred. Monomers containing other functional groups such as hydroxyl or amino groups may also be used. Minor amounts of other functional monomers such as ureido, or acetoacetate containing monomers directed towards specific objectives such as adhesion promotion or crosslinking may also be incorporated. Such functional monomers are usually incorporated at less than 15% w/w of total monomers.

In preferred compositions 5-10% of acetoacetoxy ethyl methacrylate (AAEM) monomers may be incorporated into these dispersions to improve the burnish resistance and hardness of resultant paint films. We have found that by using a crosslinkable latex such as by including 5-10% of AAEM it is possible to achieve a good balance of paint properties. The selection of the optimal comonomers and their relative proportions is based on well established principles in the art and generally balance properties such as film toughness, adhesion, hardness and cost.

The molecular weight of the copolymers in the polymeric dispersions of the present invention is generally similar to known latexes and typically would be at least 100,000 and more commonly at least 200,000. A light gelling structure in the particles is permitted in a similar fashion to the gel structure of known commercial latexes. In some cases it is desirable to enhance the gel structure by including minor amounts usually less than 1% of polyfunctional acrylate or methacrylate monomers provided film formation is not unacceptably compromised. An example of a suitable acrylate is glyceryl propoxy triacrylate.

The aqueous dispersions either anionically or non-ionically stabilised, of the present invention may be prepared by known means, for example, emulsion polymerisation. It is a preferment of this invention that when a blend of higher and low Tg aqueous dispersions is used, the low Tg polymer dispersion is non-ionically or sterically stabilised. The term sterically stabilised is an art recognised term in colloid science and means that, in aqueous systems, colloidal stability is conferred by the presence of a sheath of water soluble polymeric or oligomeric chains anchored to the particle surface.

By sterically stabilised dispersions we mean that whilst other types of stability, such as anionic or cationic, may be present, colloidal stability is able to be conferred by steric stabilisation alone. For the purposes of this invention a convenient test to ascertain whether the dispersion is sterically stabilised or not is to increase the ionic concentration of the aqueous phase to such an extent that ionic stabilisation is nullified and then to assess the stability of the dispersion.

The non sterically stabilised dispersions are anionically stabilised. We mean that while other forms of stabilisation may be present to some extent, these other forms of stabilisation are insufficient to stabilise the dispersions in the absence of the anionic stabilisation. In practice, the stability of a dispersion may be determined by increasing the ionic strength of the aqueous medium to nullify the anionic stabilisation and assessing the stability of the dispersion. If it is anionically stabilised, the dispersion would flocculate under these conditions. In practice a simple test to determine whether a dispersion is anionically stabilised is to reduce the pH of the aqueous medium until it is about 5. If the dispersion flocculates we regard it as anionically stabilised.

Examples of the preparation of non-ionically stabilised polymer dispersions suitable for the working of the present invention are described in Australian Patent No. 618,176. Also within the scope of the present invention are polymer dispersions which have a core/shell structure whereby either the hard particles or soft particles or both are structured so that the outer shell of the particle differs in polymer composition from that of the centre of the particle.

The preparation of anionically stabilised dispersion is well known and is documented in standard texts. Examples of the preparation of anionically stabilised dispersions suitable for the high Tg dispersion are described in Australian Patent Application number 16642/72.

Preferably the aqueous medium used for polymerisation is buffered with, for example, sodium bicarbonate which causes partial ionisation of the carboxylic acid contributing to in-process stability.

The aqueous dispersions are usually thermoplastic and remain thermoplastic after film formation. However, within the scope of the present invention are crosslinkable polymer dispersions where cross-linking takes place after film formation. Examples are well known in the art and particularly useful examples are described in our copending application entitled "Crosslinkable Aqueous Coating Compositions" (PCT AU94/00599).

An important characteristic of the aqueous dispersions of the present invention is their glass transition temperatures (Tg). The term glass transition temperature is well known in the art and generally defines the onset of long range molecular motion wherein the polymer preserves the outward appearance of a solid but becomes rubbery and then tacky with increasing temperature and undergoes plastic flow and elastic deformation. The theoretical Tg is often calculated in accordance with the Fox equation $1/Tg=Wi/Ti$. However, Tg can be measured in accordance with the differential thermal analysis method set out in the Journal of Paint Technology, Volume 41, pages 167-168 (1969) or by testing for softening points, using minimum film forming temperature gradient bars or thermomechanical analysis (TMA). In practice we find in most cases that the Tg as determined by the various available methods is close to the theoretical Fox Tg. However, in some cases significant variations can occur and typically anionic latexes behave as if their Tg is 10-15° C. above the Fox Tg and with non-ionic latexes they behave as if their Tg is less than their Fox Tg. In those instances we prefer to use Tg as measured on actual dispersions, after film formation using a measurement such as TMA.

In the embodiment of the present invention where a blend of high and low Tg dispersions are used, the low Tg dispersion should have a Tg of 0° C. maximum. However a better balance of paint film properties is usually achieved when the Tg is in the range −40 to −5° C. and more preferably −20 to −10° C.

Not only are stain resistant paints obtained in the present invention but in certain applications paints can be formulated using a blend of high and low Tg dispersions and these paints do not require the addition of volatile organic plasticisers. Accordingly, paints can be prepared that comply with the zero VOC requirement for low pollution paints.

In this embodiment that uses blends of high and low Tg dispersions, the high Tg dispersion of the present invention has a Tg of at least 25° C., more preferably in the range 30-70° C., and most preferably 30-40° C. There should be a difference of at least 35° C. and more preferably 45° C. between the Tg's of the high and low Tg polymeric dispersions.

In this embodiment the relative proportions of the low and high Tg dispersions is important to its working and for this embodiment we require that the volume ratio of low Tg polymeric dispersion to high Tg polymeric dispersion to be from 0.4:1 to 3:1. This is of course calculated on a non-volatile basis. In practice there is usually little difference between the weight and volume ratios. If the particles are based on the same monomers it is convenient to use the weight ratios as the densities of the particles are essentially the same. Weight ratios are used in the Examples. Preferably the volume ratio of low Tg polymeric dispersion to high Tg polymeric dispersion is from 0.6:1 to 1.5:1.

At ratios above the 3:1 upper limit the stain resistance of paint films becomes less than optimal and inadequate film hardness is achieved. At ratios below 0.4:1 film properties such as ability to coalesce satisfactorily at low temperatures is adversely affected and the defect termed "mud cracking" arises. Paints exhibiting an excellent balance of properties can also be achieved by using a binder of blends of low and high Tg polymeric dispersions where both dispersions are anionically stabilised. Suitable ratios are the same as in the case where the low Tg dispersions were non-ionically stabilised.

The compositions of the present invention are particularly suitable for gloss and semi-gloss paints but also have application in low sheen and flat paints. For best results we have found it to be advantageous to use small particle size polymer dispersions, especially for the high Tg polymer dispersion in the dispersion blend embodiment and especially for gloss and semi-gloss paints. The particle size should preferably be less than 200 nm in diameter, more preferably less than 150 nm and most preferably less than 120 nm. Preferred paints have a gloss of at least 10 (60° head) and more preferably at least 40 (60° head).

Whilst the major portion of the binder in this invention in the blend embodiment is the combination of a low Tg and high Tg polymer dispersion as described above, other binders may be included. If a third polymeric dispersion is included it may be regarded as a high or low Tg dispersion if its Tg meets the criteria set out above. For example, within the scope of the present invention are binders of polymer dispersions of −15° C. (40%), −10° C. (10%) and +50° C. (50%). In this case both the −15° C. and −10° C. dispersions are regarded together as the low Tg, and in this case the low Tg to high Tg ratio is 1:1. Furthermore, minor amounts of dispersions that are neither low or high Tg as defined in this invention may be used as well as minor amounts of solution polymers and other additives as used in art recognised quantities. Unpigmented or clear coatings are also embraced within the scope of the present invention. Stain resistant properties are of most advantage in interior coatings, the compositions of the present invention also have application as exterior paints.

Paint formulating ingredients such as pigments, pigment dispersants, mineral extenders, plastic extenders, wet edge solvents, rheology modifiers and fungicides may be incorporated in art recognised quantities. These materials may influence overall paint properties including stain resistance, tint strength and viscosity stability. Formulation methodology is well known and the influence of these various materials on paint properties is able to be ascertained by routine experimentation.

The invention will be further described by reference to the following examples of preferred embodiments.

EXAMPLE 1

This example illustrates the preparation and evaluation of a low sheen interior paint according to the invention.

1.1 Preparation of Aqueous Dispersion of Fox Tg +22° C.

| | Material | Wt % |
|---|---|---|
| A. | Water | 21.984 |
| | Nonyl phenol ethoxylate sulphate surfactant* | 0.350 |
| B. | Water | 0.097 |
| | Sodium carbonate | 0.018 |
| | Ammonium persulphate | 0.014 |
| C. | Water | 3.836 |
| | Sodium carbonate | 0.197 |
| | Ammonium persulphate | 0.034 |
| D. | Methyl methacrylate | 18.371 |
| | Butyl acrylate | 16.615 |
| | Styrene | 7.188 |
| | N-(2-Methacryloyloxy ethyl) ethylene urea (25% in methyl methalcrylate) | 1.331 |
| | Acrylic acid | 0.865 |
| | Nonyl phenol ethoxylate sulphate surfactant* | 0.700 |
| | Water | 27.761 |
| E. | Defoamer | 0.010 |
| | Biocide | 0.080 |
| | Ammonium hydroxide (25% in water) | 0.549 |
| | | 100.0 |

*60% in water

Stage A was added to a vessel equipped with stirrer, condenser and feed facilities and heated to 80° C. with stirring under a nitrogen blanket. Feed stage D was premixed and emulsified under high shear. Stage B was added to stage A and stirred for 10 minutes prior to concurrently starting feed stages C and D. Both C and D were added over 240 minutes while maintaining the reaction temperature at 80° C. At the end of the feeds, the reaction was held at 80° C. for a further 1 hour and then cooled to room temperature. Stage E was added and stirred for 10 minutes.

The solids of this dispersion was 45% by weight. It had a pH of 8.0 and the particle size (Dn) was 80 nm. This dispersion had an "a" value of 5.2. This dispersion was designated Dispersion 1.

1.2 Preparation of a Low Sheen Paint using Dispersion 1

| | Material | Wt % |
|---|---|---|
| A | Water | 13.5 |
| | Propylene glycol | 1.0 |
| | Amino methyl propanol | 0.1 |
| | Poly acrylic acid sodium salt dispersant | 0.3 |
| | Octyl phenol nonionic surfactant | 0.5 |
| | Defoamer | 0.3 |
| | Titanium Dioxide (Rutile pigment) | 25.5 |
| | Amorphous silica | 2.5 |
| | Calcium carbonate extender | 6.5 |
| B | Dispersion 1 | 22.0 |
| | Water | 19.9 |
| C | Propylene glycol | 5.0 |
| | Texanol* | 2.0 |
| | Associative thickener | 0.3 |
| | Cellulosic thickener | 0.5 |
| | Biocide | 0.1 |
| | | 100.0 |

*2,2,4-trimethyl 1,3-pentane diol mono isobutyrate

The materials from stage A were added sequentially with stirring and then were dispersed for 10-15 minutes with high speed mixing to achieve good pigment dispersion. The millbase was gradually let down with stage B and the mixture was stirred for 10 minutes and then the pH was adjusted to 9.0 using ammonium hydroxide (25% solution in water). Stage C materials were added sequentially with 10 minutes stirring between each, the thickener being gradually added in a pencil thin stream. The stirrer speed was increased as the viscosity increased to ensure efficient mixing. The composition was stirred at a moderate speed for a further 10 minutes.

The resulting paint had volume solids 36%, PVC 38%, and pH 9.0. This was designated Paint 1.

1.3 Evaluation of Paint

Paint 1 (one coat) was drawn down. The paint film was then left to dry for one week at 25° C. The reagents used to test paint stain resistance include blue food colouring, red ink, red wine, tea and coffee solutions and a special hydrophobic testing compound, "K and N". These staining agents were applied to paint films and left to stain for one hour. Excess stain reagent was then removed and the paint film thoroughly cleaned using a household cleaner and paper tissue. The panel was visually assessed for stain resistance and rated relative to an appropriate control using a scale of 1-5 where 5=excellent stain resistance and 1=poor stain resistance. Generally a rating of at least 3 is required for paints with good stain resistance properties.

To assess tint strength, a standard tinter at a specified concentration was added to paint. The tinted paint was then shaken for five minutes using a Red Devil High Speed Paint Mixer to ensure adequate tinter incorporation. The tinted paint was applied to a Leneta 5DX card to give a wet film build of 40 μm and force dried for 20 minutes at 80° C. A second coat of paint, also at a wet film build of 40 μm, was applied over the first paint coat and force dried for 20 minutes at 80° C. Using a Milton Roy Colour Graph Spectrophotometer, the tint strength of the paint was measured against a computer stored colour reference. Paints were rated for tint strength on a scale of 1-5 where 1 is poor being more than 20% low in tint strength, and 5 is excellent, being less than 5% low in tint strength.

A rating of 4 or 5 is desirable for commercial paints.

Paint viscosities were measured with a Brookfield low shear viscometer and Cone and Plate high shear viscometer after 1, 2, 3 and 4 weeks storage at 50° C. They were also measured at low (8.5) and high (9.5) pH. They were rated for viscosity stability on a scale of 1-5 where 1 is poor and 5 is excellent. Generally paints were assessed as poor when the low shear viscosity increased by more than 100% and excellent when the low shear viscosity increased by less than 20%. To be rated as at least 3, the high shear viscosity had to be within acceptable ranges for brush application after storage. Acceptable paints had a rating of at least 3.

Paint 1 was rated as 4 for stain resistance, 5 for tint strength and 5 for viscosity stability.

EXAMPLES 2-3

These Examples illustrate the preparation of aqueous dispersions according to the invention. The method of Example 1 was repeated with the relative proportions of methyl methacrylate and butyl acrylate being adjusted to give Fox Tgs of 10 and 27.

These dispersions were designated Dispersions 2 and 3 respectively. Each of these dispersions had an "a" value of 5.2 and particle size 87 nm and 90 nm respectively. Paints were formulated as in Example 1 replacing Dispersion 1 with Dispersion 2 and Dispersion 3 in turn to produce Paint 2 and Paint 3. The evaluation results for Paint 2 and Paint 3 were 4 and 4 for stain resistance, 5 and 5 for tint strength and 5 and 4 for viscosity stability respectively.

EXAMPLES 4-7

These Examples illustrate the preparation of aqueous polymeric dispersions according to the invention having varying Tgs. These dispersions were generally too high in Tg to enable paints with suitable levels of volatile plasticiser to be formulated when the dispersion was used as the sole binder. However, they are particularly useful when combined with a lower Tg dispersion according to an alternative embodiment of the present invention. A Fox Tg of +35° C. disperson was prepared using the method of Example 1 with the following materials:

| | Material | Wt % |
|---|---|---|
| A. | Water | 30.833 |
| | Nonyl phenol ethoxylate sulphate surfactant* | 0.350 |
| B. | Water | 0.093 |
| | Sodium carbonate | 0.017 |
| | Ammonium persulphate | 0.013 |
| C. | Water | 3.665 |
| | Sodium carbonate | 0.033 |
| | Ammonium persulphate | 0.188 |
| D. | Methyl methacrylate | 20.616 |
| | Butyl acrylate | 11.962 |
| | Styrene | 6.872 |
| | Acetoacetoxy ethyl methacrylate | 2.121 |
| | Acrylic acid | 0.827 |
| | Nonyl phenol ethoxylate sulphate surfactant* | 0.669 |
| | Water | 20.953 |

-continued

| | Material | Wt % |
|---|---|---|
| E. | Defoamer | 0.010 |
| | Biocide | 0.080 |
| | Ammonium hydroxide (25% in water) | 0.698 |
| | | 100.00% |

*60% in water

The solids of this dispersion was 43% by weight and the particle size (Dn) was 90 nm. It had a MFFT of 44° C. (crack point). This dispersion was designated Dispersion 4. Dispersions 5, 6 and 7 were prepared in similar fashion except that the relative proportions of methyl methacrylate and butyl acrylate were adjusted to give Fox Tgs of 30, 40 and 45 respectively. Particle sizes of Dispersions 4, 5, 6 and 7 were 82, 90, 85 and 95 nm respectively.

EXAMPLE 8-14

These examples are within the scope of the present invention illustrate generally good paint properties as the "a" value in Equation I is varied within the defined range. The "a" value was varied by changing the styrene level of Example 1 and/or the (meth)acrylic acid level.

Dispersions were prepared as in Example 1 with the following styrene and carboxylic acid monomer levels as set out in TABLE 2. The methyl methacrylate and butyl acrylate levels were adjusted to give the appropriate Tg. The "a" value, Tg and paint evaluation results when formulated as a low sheen paint as in Example 1 are also set out in TABLE 2.

TABLE 2

| Example No | Tg | % Styrene | % AA | % MA | Particle Size (nm) | a | Stain | TS | VS |
|---|---|---|---|---|---|---|---|---|---|
| 8 | 22 | 57 | 3 | 0 | 105 | 6.9 | 4 | 3 | 4 |
| 9 | 22 | 8 | 2 | 0 | 90 | 3.3 | 4 | 3 | 3 |
| 10 | 22 | 29 | 2 | 0 | 93 | 8.5 | 4 | 3 | 5 |
| 11 | 0 | 44 | 2 | 0 | 85 | 12.3 | 4 | 5 | 5 |
| 12 | 0 | 44 | 3 | 0 | 90 | 5.4 | 4 | 4 | 5 |
| 13 | 0 | 43 | 4 | 0 | — | 3 | 4 | 5 | 5 |
| 14 | 22 | 16 | 1 | 2 | 80 | 6.2 | 4 | 4 | 4 |

AA = Acrylic Acid
MA = Methacrylic Acid
TS = Tint Strength
VS = Viscosity Stability

EXAMPLE 15-16

These Examples illustrate the use of alkyl acrylate ester monomers other than butyl acrylate.

Example 1 was repeated except that the butyl acrylate monomer was replaced with ethyl acrylate (Example 15) and 2 ethyl hexyl acrylate (Example 16). The levels of each of these two monomers and the level of methyl methacrylate were adjusted to give the same Fox Tg as in Example 1. These two dispersions were designated Dispersion 15 and Dispersion 16 respectively and had particle sizes 85 and 90 nm respectively. When evaluated in a paint as in Example 1, the test results were as follows:

Stain resistance 4 and 4, tint strength 5 and 4, viscosity stability 5 and 5 respectively.

EXAMPLE 17

This Example illustrates the use of a blend of dispersions according to the invention and the evaluation of a gloss paint formulated with this blend of dispersions.

17.1 Preparation of Aqueous Dispersion of Fox Tg −15° C.

|   | Material | Wt % | | |
|---|---|---|---|---|
| A. | Fatty alcohol ethoxylate surfactant* | 1.191 | | |
|   | Water | 12.671 | | |
|   | t-butyl perbenzoate | 0.368 | | |
|   | 30% hydrochloric acid | trace | | |
| B. | Ferrous sulphate | 0.008 | | |
|   | Water | 0.885 | | |
|   |   | Feed 1 | Feed 2 | Feed 3 |
| C. | Methyl methacrylate | 1.608 | 2.910 | 9.161 |
|   | Butyl acrylate | 3.066 | 5.549 | 17.465 |
|   | Glyceryl propoxy triacrylate | 0.053 | 0.095 | 0.299 |
|   | Acetoacetoxy ethyl methacrylate | 0.525 | 0.950 | 2.992 |
|   | Fatty alcohol ethoxylate surfactant* | 0.715 | 0.461 | 0.960 |
|   | Water | 4.847 | 7.397 | 23.471 |
| D. | Sodium Erythorbate | 0.028 | 0.038 | 0.132 |
|   | Water | 0.264 | 0.414 | 1.308 |
| E. | Defoamer | 0.050 | | |
|   | Cosolvent | 0.050 | | |
|   | Biocide | 0.080 | | |
|   |   | 100.000 | | |

*As described in Example 3 of International Patent Application No. PCT/AU90/00565.

Stage A was added to a vessel equipped with stirrer, condenser and feed facilities and heated to 70° C. with stirring under a nitrogen blanket. Stage D Feeds 1, 2 and 3 were separately made up as stock solutions. Stage C Feeds 1, 2 and 3 were each premixed and separately emulsified under high shear and stage D Feeds 1, 2 and 3 were added to Stage C Feeds 1, 2 and 3 respectively. Stage B was added to Stage A and stirred for 10 minutes prior to starting stage C and D feeds. Feed 1 was fed over 50 minutes, Feed 2 over 45 minutes and Feed 3 over 120 minutes maintaining the reaction temperature at 70° C. At the end of the feeds, the reaction mixture was allowed to cool to room temperature and stage E was added and stirred for 10 minutes.

The solids of this dispersion was 48% by weight and the particle size (Dn) was 90 nm. It had a MFFT <10° C. (crack point). This dispersion was designated Dispersion 17.

17.2 Preparation of Gloss Paint having a Ratio of low Tg to High Tg Polymeric Dispersion of 0.67 to 1.0

|   | Material | Wt % |
|---|---|---|
| A. | Water | 7.3 |
|   | Propylene glycol | 1.0 |
|   | Amino methyl propanol | 0.1 |
|   | Nonionic ethoxylate surfactant | 0.4 |
|   | Polyacrylic acid sodium salt dispersant | 0.3 |
|   | Defoamer | 0.2 |
|   | Titanium Dioxide (Rutile pigment) | 19.0 |

-continued

|   | Material | Wt % |
|---|---|---|
| B. | Dispersion blend (60% Dispersion 4 and 40% Dispersion 17 on a non-volatile basis) | 59.2 |
|   | Water | 3.1 |
| C. | Propylene glycol | 5.3 |
|   | Texanol | 2.6 |
|   | Associative thickener | 1.0 |
|   | Cellulosic thickener | 0.4 |
|   | Biocide | 0.1 |
|   |   | 100.0 |

17.3 Paint Evaluation

This paint was evaluated using the methods of Example 1 and was rated as 4 for stain resistance, 4 for tint strength and 5 for viscosity stability.

EXAMPLE 18

This Example illustrates the preparation of a gloss paint in accordance with the invention.

The method of Example 17 was repeated except that the paint formulation was as follows:

|   | Material | Wt % |
|---|---|---|
| A | Water | 5.0 |
|   | Propylene glycol | 1.0 |
|   | Amino methyl propanol | 0.1 |
|   | Polyacrylic acid sodium salt dispersant | 0.3 |
|   | Propylene/ethylene oxide nonionic surfactant | 0.5 |
|   | Defoamer | 0.3 |
|   | Titanium Dioxide (Rutile pigment) | 21.0 |
| B | Dispersion blend (60% Dispersion 4 and 40% Dispersion 17 on a non-volatile basis) | 59.0 |
|   | Water | 6.0 |
| C | Propylene glycol | 4.0 |
|   | Texanol | 1.4 |
|   | Associative thickener | 1.0 |
|   | Cellulosic thickener | 0.3 |
|   | Biocide | 0.1 |
|   |   | 100.0 |

This paint was designated Paint 16 and had the same PVC and volume solids as Paint 17. Its evaluation rating was the same as for Paint 17.

EXAMPLE 19

This Example illustrates the preparation of a gloss paint in accordance with the invention. The method of Example 17 was repeated except that the paint formulation was as follows:

|   | Material | Wt % |
|---|---|---|
| A | Water | 8.0 |
|   | Propylene glycol | 1.0 |
|   | Amino methyl propanol | 0.1 |
|   | Polycarboxylic acid dispersant | 0.2 |
|   | Nonionic surfactant | 0.5 |
|   | Defoamer | 0.3 |
|   | Titanium Dioxide | 21.0 |
| B | Dispersion blend (60% Dispersion 4 and 40% Dispersion 17 on a non-volatile basis) | 59.0 |
|   | Water | 1.2 |

|   |   |   |
|---|---|---|
| C | Propylene glycol | 5.0 |
|   | Texanol | 2.6 |
|   | Associative thickener | 0.7 |
|   | Cellulosic thickener | 0.3 |
|   | Biocide | 0.1 |
|   |   | 100.0 |

This paint was designated Paint 19 and had a PVC of 17 and volume solids of 38%. Again, its evaluation according to the method in Example 1 was the same as Paint 17.

EXAMPLE 20

This Example illustrates the preparation of a low sheen paint using a blend of low and high Tg polymeric dispersions. The method of Example 17 was repeated except that the paint formulation was as follows:

|   |   |   |
|---|---|---|
| A | Water | 13.5 |
|   | Propylene glycol | 1.0 |
|   | Amino methyl propanol | 0.1 |
|   | Sodium polyacrylate dispersant | 0.3 |
|   | Nonyl phenol ethoxylate nonionic surfactant | 0.5 |
|   | Defoamer | 0.3 |
|   | Titanium Dioxide (Rutile pigment) | 18.0 |
|   | Amorphous silica | 3.6 |
|   | Hydrous clay | 7.0 |
| B | Dispersion blend (60% Dispersion 4 and 40% Dispersion 17 and a non-volatile basis) | 36.0 |
|   | Ropaque (Rohm and Haas) | 5.4 |
|   | Water | 5.9 |
| C | Propylene glycol | 5.0 |
|   | Texanol | 2.5 |
|   | Associative thickener | 0.5 |
|   | Cellulosic thickener | 0.3 |
|   | Biocide | 0.1 |
|   |   | 100.0 |

The resulting paint was designated Paint 20 and had a PVC of 38 and volume solids of 39. It was rated 3-4 for stain resistance and 4 for tint strength and 5 for viscosity stability.

EXAMPLE 21

This Example illustrates the preparation of a low sheen paint using a different blend of low and high Tg polymeric dispersions.

The method of Example 1 was repeated except that the paint formulation had a blend 40% Dispersion 4 and 60% Dispersion 17 (22 parts in total). The paint was rated as 3 for stain resistance, 4 for tint strength and 5 for viscosity stability.

EXAMPLE 22

This Example illustrates the preparation of a low sheen paint using a blend of low and high Tg polymeric dispersions.

The method of Example 17 was repeated except that the paint formulation was as follows:

|   |   |   |
|---|---|---|
| A | Water | 10.0 |
|   | Propylene glycol | 1.0 |
|   | Amino methyl propanol | 0.1 |
|   | Polycarboxylic acid dispersant | 0.3 |
|   | Nonyl phenol surfactant | 0.5 |
|   | Defoamer | 0.3 |
|   | Titanium Dioxide (Rutile pigment) | 16.8 |
|   | Amorphous silica | 3.0 |
|   | Clay | 7.2 |
| B | Dispersion blend (60% Dispersion 4 and 40% Dispersion 17 on a non-volatile basis) | 37.0 |
|   | Water | 15.9 |
| C | Propylene glycol | 5.0 |
|   | Texanol | 2.0 |
|   | Associative thickener | 0.3 |
|   | Cellulosic thickener | 0.5 |
|   | Biocide | 0.1 |
|   |   | 100.0 |

This paint was designated Paint 22 and had a PVC of 40 and a volume solids of 35.

EXAMPLES 23-33

These examples illustrate the preparation and testing of paints formulated with variations in the ratios of low and high Tg dispersions as well as variations in the Tg of the high Tg dispersion. These blends were formulated as low sheen paints as in Example 20. The variations and results of the evaluation are set out in TABLE 3.

TABLE 3

| Example No | Anionic Dispersion (Tg) | Ratio of low Tg to High Tg Dispersion | SR | TS | VS |
|---|---|---|---|---|---|
| 23 | Dispersion 5 (30) | 40:60 | 4 | 4 | 4 |
| 24 | Dispersion 6 (40) | 40:60 | 4 | 5 | 4 |
| 25 | Dispersion 7 (45) | 40:60 | 4 | 5 | 5 |
| 26 | Dispersion 5 (30) | 50:50 | 3-4 | 4 | 5 |
| 27 | Dispersion 4 (35) | 50:50 | 3-4 | 4 | 5 |
| 28 | Dispersion 6 (40) | 50:50 | 3-4 | 4 | 5 |
| 29 | Dispersion 7 (45) | 50:50 | 3-4 | 4 | 5 |
| 30 | Dispersion 5 (30) | 60:40 | 3 | 4 | 5 |
| 31 | Dispersion 4 (35) | 60:40 | 3 | 3-4 | 5 |
| 32 | Dispersion 6 (40) | 60:40 | 3 | 4 | 5 |
| 33 | Dispersion 7 (45) | 60:40 | 3 | 4 | 5 |

SR = Stain Resistance
TS = Tint Strength
VS = Viscosity Stability

EXAMPLES 34-35

These examples illustrate the preparation of aqueous dispersions using high Tg hydrophobic aromatic monomers other than styrene.

Example 1 was repeated at the same Tg with a weight for weight replacement of the styrene monomer with vinyl toluene (Example 34) and alpha methyl styrene (Example 35). For Example 34 the methyl methacrylate percentage was 18.538 and the butyl acrylate percentage was 16.426. For Example 35 the methyl methacrylate percentage was 16.834 and the butyl acrylate percentage was 18.130. The dispersions were designated Dispersion 34 and Dispersion 35 respectively.

These were evaluated in a paint as set out in Example 1 and gave the following test results. Stain resistance 4 and 4; Tint strength 4 and 4; viscosity stability 5 and 5.

EXAMPLES 36-41

These Examples are comparative examples outside the scope of the present invention. These Examples show less than satisfactory performance when the value of "a" in the formula is outside the defined range.

Dispersions 36, 37 and 38 were prepared in accordance with Example 1 with appropriate adjustments to acrylic acid level and/or styrene level to give a Tg of 22° C. for each example.

Examples 39 and 40 were dispersions that corresponded to Samples 1 and 8 of Rohm and Haas European Patent No. EP 0 466 409. Example 41 corresponds to Example 1 of Hoecsht's Australian Patent No. 500,903. Each of these dispersions was evaluated in paints for stain resistance, tint strength and viscosity stability as in Example 1 to produce the results set out in TABLE 4. None of these paints was considered to be satisfactory.

TABLE 4

| Example No. | a | % Styrene | % AA | % MA | SR | TS | VS |
|---|---|---|---|---|---|---|---|
| 36 | 0 | 0 | 2 | 0 | 5 | 5 | 1 |
| 37 | 11.4 | 16 | 0 | 3 | 3 | 3 | 1 |
| 38 | 1.9 | 42 | 5 | 0 | 5 | 3 | 1 |
| 39 | 27.3 | 29.5 | 0 | 2.5 | 2 | 3 | 2 |
| 40 | 68.4 | 47.2 | 0 | 2.0 | 2 | 2 | 3 |
| 41 | 17.5 | 47.6 | 0.95 | 1.9 | 2 | 3 | 2 |

AA = Acrylic Acid
MA = Methacrylic Acid
SR = Stain resistance
TS = Tint Strength
VS = Viscosity Stability The claims of the invention are as follows:

1. A water-borne domestic household paint composition comprising an anionically stabilised dispersion polymerised from:
   a) a carboxylic acid containing ethylenically unsaturated monomer selected from the group consisting of acrylic acid, methacrylic acid and mixtures thereof;
   b) a hydrophobic aromatic ethylenically unsaturated high glass transition temperature ("Tg") monomer selected from the group consisting of styrene and alpha methyl styrene; and
   c) a $C_2$-$C_{12}$ acrylate ester monomer;
   wherein the relative proportions of ethylenically unsaturated monomers are selected such that the following Equation I is satisfied:

$$a = \frac{5+b}{(c+d/2.4)^2} \quad (I)$$

where
   a=2-3
   b=weight percent hydrophobic aromatic high Tg monomer
   c=weight percent acrylic acid
   d=weight percent methacrylic acid,
wherein the polymeric dispersion has a Tg of between −15° C. and 30° C., and
wherein the paint composition has the following properties:
   (i) stain resistance of at least 3 as measured on a scale of 1-5 relative to an appropriate control sample comprising a paint class similar to that of said paint composition being measured using the scale,
   (ii) tint strength of at least 4 as measured on a scale of 1-5 where 1 is poor, being more than 20% low in tint strength, and, 5 is excellent, being less than 5% low in tint strength relative to a stored color reference having a defined and predetermined color, and
   (iii) viscosity stability of at least 3 as measured on a scale of 1-5 at a pH of between about 8.5 and about 9.5, where 1 is poor when the low shear viscosity increased by more than 100% and 5 is excellent when the low shear viscosity increased by less than 20%.

2. The water-borne domestic household paint composition of claim 1, wherein the hydrophobic aromatic ethylenically unsaturated monomer is in the range 8-70%.

3. The water-borne domestic household paint composition of claim 1, wherein the hydrophobic aromatic ethylenically unsaturated monomer is in the range 10-50%.

4. The water-borne domestic household paint composition of claim 1, wherein the hydrophobic aromatic ethylenically unsaturated monomer is styrene.

5. The water-borne domestic household paint composition of claim 1, wherein a in Equation I is in the range 2.5 to 10.0.

6. The water-borne domestic household paint composition of claim 1, wherein the Tg of the polymeric dispersion is −5 to 30° C.

7. The water-borne domestic household paint composition of claim 1, wherein the particle size of the polymeric dispersion is 200 nanometers (number average) maximum.

8. The water-borne domestic household paint composition of claim 1, wherein the particle size of the polymeric dispersion is 150 nanometers maximum.

9. The water-borne domestic household paint composition of claim 1, wherein the particle size of the polymeric dispersion is 120 nanometers maximum.

10. The water-borne domestic household paint composition of claim 1, wherein the weight majority of the carboxylic acid containing ethylenically unsaturated monomer is in favour of acrylic acid.

11. The water-borne domestic household paint composition of claim 1, wherein the carboxylic acid containing ethylenically unsaturated monomer is selected from acrylic acid and less than 4 wt % methacrylic acid, relative to the total monomers.

12. The water-borne domestic household paint composition of claim 1, wherein the carboxylic acid containing ethylenically unsaturated monomer is acrylic acid.

* * * * *